United States Patent
Ito et al.

(10) Patent No.: US 9,880,639 B2
(45) Date of Patent: Jan. 30, 2018

(54) POINTING SYSTEM, POINTING DEVICE, AND POINTING CONTROL METHOD

(75) Inventors: Osamu Ito, Tokyo (JP); Hideo Kawabe, Saitama (JP); Takeshi Maeda, Tokyo (JP); Kousuke Seki, Tokyo (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 14/118,590

(22) PCT Filed: May 22, 2012

(86) PCT No.: PCT/JP2012/003335
§ 371 (c)(1),
(2), (4) Date: Nov. 19, 2013

(87) PCT Pub. No.: WO2012/164871
PCT Pub. Date: Dec. 6, 2012

(65) Prior Publication Data
US 2014/0085200 A1    Mar. 27, 2014

(30) Foreign Application Priority Data
May 31, 2011  (JP) ................................. 2011-122494

(51) Int. Cl.
*G06F 3/033* (2013.01)
*G06F 3/01* (2006.01)
(Continued)

(52) U.S. Cl.
CPC .............. *G06F 3/033* (2013.01); *G06F 3/016* (2013.01); *G06F 3/04812* (2013.01); *G06F 3/0346* (2013.01); *G06F 2203/014* (2013.01)

(58) Field of Classification Search
CPC ................. G06F 3/016; G06F 3/03543; G06F 2203/013; A63F 13/06; A63F 2300/1037; G05D 19/02
(Continued)

(56) References Cited

U.S. PATENT DOCUMENTS 7,084,854 B1 * 8/2006 Moore ................ G06F 3/03543
                                                         345/156
8,745,514 B1 * 6/2014 Davidson .............. G06F 3/0487
                                                         345/173
(Continued)

FOREIGN PATENT DOCUMENTS

JP      11-004966      1/1999
JP      2002-236550    8/2002
(Continued)

*Primary Examiner* — Amare Mengistu
*Assistant Examiner* — Gloryvid Figueroa-Gibson
(74) *Attorney, Agent, or Firm* — Wolf, Greenfield & Sacks, P.C.

(57) ABSTRACT

[Object] To provide a pointing system capable of presenting an intuitive operational feeling to a user.
[Solving Means] A pointing device includes a casing, a tactile sense presentation section, and a sensor section. The sensor section detects an operation for the casing and outputs an operation signal for controlling a movement of a pointer on a screen. The control apparatus includes an area setting section and a signal generation section. The area setting section sets a first area that belongs to an inside of a display area of an object on the screen, a second area that belongs to an outside of the display area of the object, and a third area that belongs to a boundary portion between the first area and the second area. The signal generation section calculates a position of the pointer based on the operation signal to generate, when the pointer is located in the first area, a control signal by which the tactile sense presentation section is driven in a first drive mode and generates, when (Continued)

the pointer is located in the third area, a control signal by which the tactile sense presentation section is driven in a second drive mode.

19 Claims, 11 Drawing Sheets

(51) Int. Cl.
  *G06F 3/0481* (2013.01)
  *G06F 3/0346* (2013.01)
(58) Field of Classification Search
  USPC .................................. 345/56–167, 179–184
  See application file for complete search history.

(56) References Cited

U.S. PATENT DOCUMENTS

| | | | | |
|---|---|---|---|---|
| 2002/0021277 A1* | 2/2002 | Kramer | ................... | G06F 3/016 345/156 |
| 2002/0024501 A1* | 2/2002 | Shalit | ..................... | G06F 3/016 345/163 |
| 2002/0109668 A1* | 8/2002 | Rosenberg | ............. | G05G 9/047 345/156 |
| 2008/0062145 A1* | 3/2008 | Shahoian | ............... | G06F 1/1616 345/173 |
| 2009/0303175 A1* | 12/2009 | Koivunen | ............... | A63F 13/10 345/156 |
| 2009/0307588 A1 | 12/2009 | Tauchi et al. | | |
| 2010/0295667 A1* | 11/2010 | Kyung | .................... | G06F 3/016 340/407.2 |
| 2011/0012838 A1* | 1/2011 | Pance | ................. | G06F 3/03543 345/173 |
| 2011/0163946 A1* | 7/2011 | Tartz | ....................... | G06F 3/016 345/156 |
| 2011/0175803 A1* | 7/2011 | Serafin | .................. | B60K 37/06 345/156 |

FOREIGN PATENT DOCUMENTS

| | | |
|---|---|---|
| JP | 2003-085590 | 3/2003 |
| JP | 2009-294827 | 12/2009 |
| WO | WO 2009/035005 | 3/2009 |

\* cited by examiner

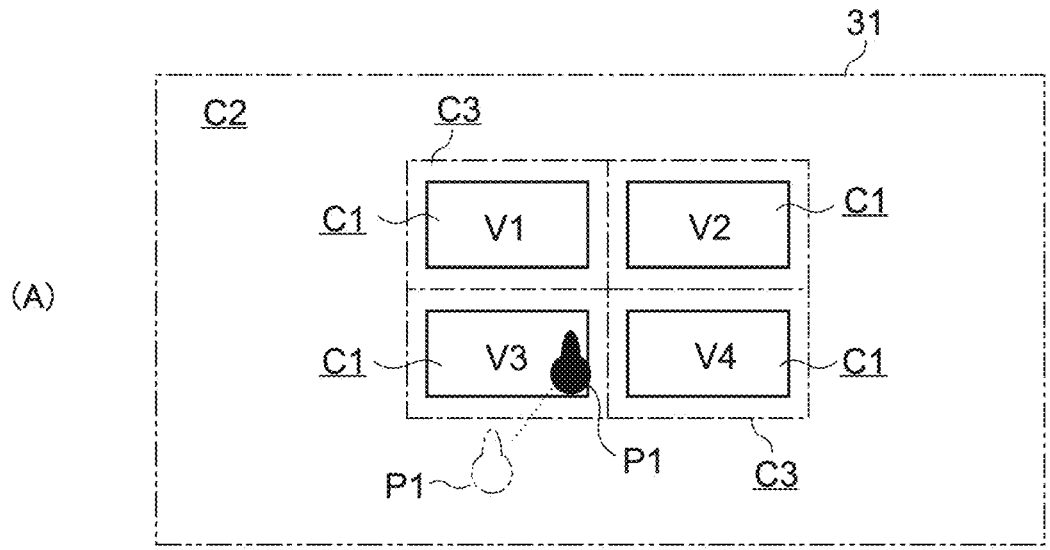
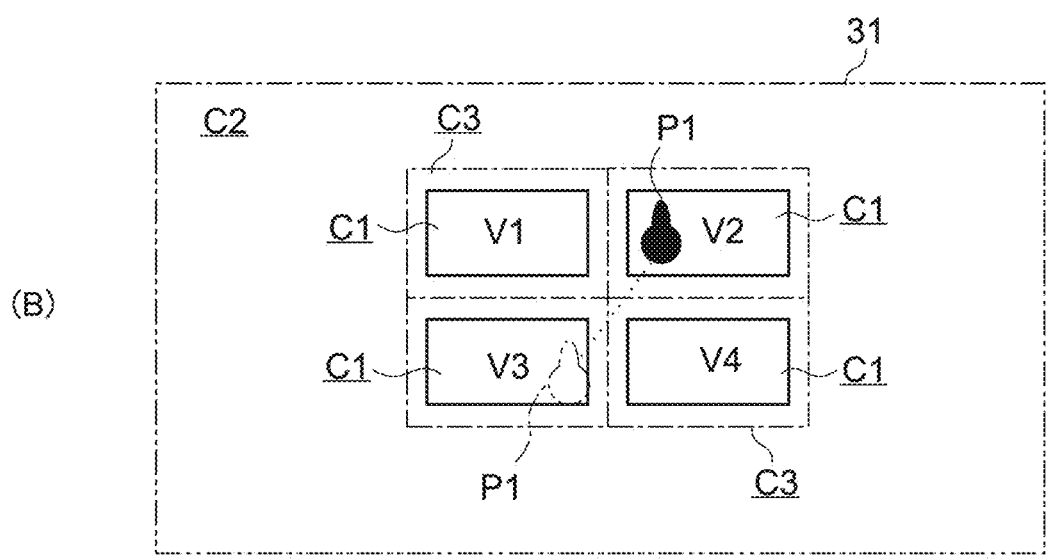
FIG.6

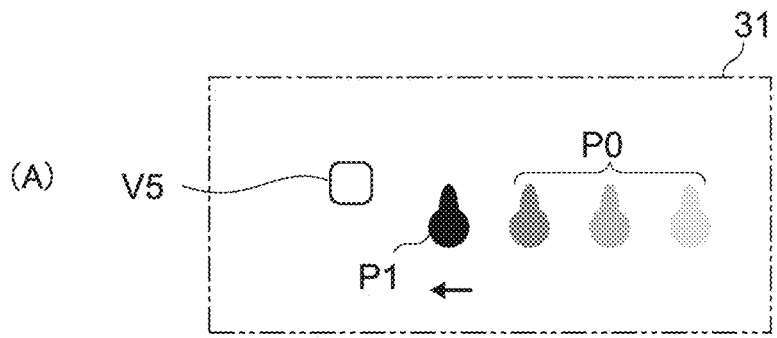
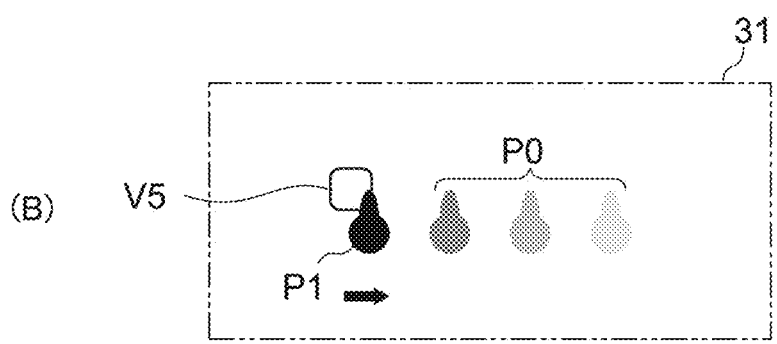
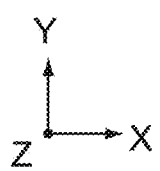
FIG.8

POINTING SYSTEM, POINTING DEVICE, AND POINTING CONTROL METHOD

TECHNICAL FIELD

The present technology relates to a pointing system, a pointing device, and a pointing control method for moving a pointer displayed on a screen.

BACKGROUND ART

A mouse is widely used as an input apparatus for operating a GUI (Graphical User Interface) displayed two-dimensionally on a display. In recent years, various input apparatuses of a spatial operation type have been proposed without being limited to input apparatuses of a planar operation type that are typified by a mouse.

For example, Patent Document 1 describes a spatial operation type input apparatus including an acceleration detection section to detect an acceleration in a first direction, an angular velocity detection section to detect an angular velocity about an axis of a second direction orthogonal to the first direction, and a calculation means for calculating a velocity value of a casing in the first direction based on the acceleration and the angular velocity. It is assumed that with this, a natural movement of a pointer displayed on a screen can be attained for a movement of the input apparatus, thus improving the operability.

Patent Document 1: WO2009/035005

SUMMARY OF INVENTION

Problem to be Solved by the Invention

In recent years, the pointing system has been required for further improvement in operability. For example, in a conventional pointing system, an operation of moving the pointer largely depends on visual recognition of a user, and an enormous burden may be put on the user in some cases depending on an operation environment. For that reason, improvement in operability by which the user can obtain a more intuitive operational feeling is required.

In view of the circumstances as described above, it is an object of the present technology to provide a pointing system, a pointing device, and a pointing control method that are capable of presenting an intuitive operational feeling to a user.

Means for Solving the Problem

According to an embodiment of the present technology, there is provided a pointing system including a pointing device and a control apparatus.

The pointing device includes a casing, a tactile sense presentation section, and a sensor section. The tactile sense presentation section is configured to be capable of presenting a tactile sense to the casing. The sensor section detects an operation for the casing and outputs an operation signal for controlling a movement of a pointer on a screen.

The control apparatus includes an area setting section and a signal generation section.

The area setting section sets a first area that belongs to an inside of a display area of an object on the screen, a second area that belongs to an outside of the display area of the object, and a third area that belongs to a boundary portion between the first area and the second area.

The signal generation section calculates a position of the pointer on the screen based on the operation signal to generate, when the pointer is located in the first area, a first control signal by which the tactile sense presentation section is driven in a first drive mode. The signal generation section generates, when the pointer is located in the third area, a second control signal by which the tactile sense presentation section is driven in a second drive mode different from the first drive mode.

According to the pointing system described above, since the tactile sense is fed back to the user via the casing at the time of a pointing operation made on the object, it is possible to reduce the degree of dependence on visual recognition of the user and provide a more intuitive pointing operational feeling. Further, when the pointer is located in the boundary portion between the inside and the outside of the display area of the object, a tactile sense that is different from one when the pointer is located inside the display area is presented. Therefore, it is possible to induce an appropriate pointing operation to be made on the object and achieve improvement in operational feeling.

The tactile senses presented by the tactile sense presentation section include hyperthermic stimulation, electrical stimulation, and the like in addition to mechanical stimulation including a sense of tactile pressure, a sense of vibration, and a sense of movement. The tactile sense presentation section as one embodiment is formed of a single of or a plurality of vibrating bodies that generate vibrations. Examples of the vibrating bodies include a voice coil motor that generates a vibration in one axis direction and a vibration motor that generates vibrations in multi-axis directions by using a centrifugal force of a rotating eccentric weight.

The first drive mode and the second drive mode are appropriately set based on strength, a period, and a rhythm of a tactile sense, combinations thereof, and the like. The first drive mode and the second drive mode are not particularly limited as long as the modes are in the form that allows a user to recognize a difference in tactile sense therebetween. In the case where the tactile sense presentation section is formed of the vibrating bodies, a tactile sense can be changed in the form that is distinguishable by the user, such as the strength of vibration (amplitude), a vibration period (frequency), and a vibration direction.

The type of pointing device is not particularly limited and may be a spatial operation type input apparatus or a planar operation type input apparatus. Typically, the planar operation type input apparatus is a mouse operated on a desk. Further, various types of input apparatuses capable of performing a pointing operation by detecting movements of the hands and fingers of a user, such as a touch panel and a touch pad, are also applicable.

Examples of the object displayed on the screen include figures and images, such as icons, symbolically representing contents of programs and instructions to be executed. In addition thereto, the object includes a two-dimensional video or a three-dimensional video displayed on the screen. In this case, the area setting section may set the first to third areas as two-dimensional coordinates or three-dimensional coordinates in accordance with the displayed object.

In the case where the pointing device is a spatial operation type input apparatus, the tactile sense presentation section may include a plurality of vibrating bodies each capable of generating a vibration in an arbitrary axis direction by being individually driven.

Thus, various tactile senses each corresponding to an operation of moving the casing by the user can be presented, and a function of assisting a user's pointing operation can be provided.

For example, as an embodiment, the signal generation section generates, when determining that the pointer is approaching the object by an operation of the casing, a third control signal by which the tactile sense presentation section is driven toward a moving direction of the casing.

On the other hand, the signal generation section generates, when determining that the pointer is getting away from the object by an operation of the casing, a fourth control signal by which the tactile sense presentation section is driven toward a direction opposite to the moving direction of the casing.

Thus, a tactile sense presentation to lead the pointer to the object can be achieved, and the operability can be improved.

According to an embodiment of the present technology, there is provided a pointing device including a casing, a tactile sense presentation section, a sensor section, and a signal generation section.

The tactile sense presentation section is configured to be capable of imparting a tactile sense to the casing.

The sensor section detects a movement of the casing within a space and outputs an operation signal for controlling a movement of a pointer on a screen.

The signal generation section generates, when the pointer is located in an inside of a display area of an object on the screen, a first control signal by which the tactile sense presentation section is driven in a first drive mode. The signal generation section generates, when the pointer is located in a predetermined area around the object, a second control signal by which the tactile sense presentation section is driven in a second drive mode different from the first drive mode.

According to an embodiment of the present technology, there is provided a pointing control method including setting a first area that belongs to an inside of a display area of an object on a screen, a second area that belongs to an outside of the display area of the object, and a third area that belongs to a boundary portion between the first area and the second area.

A position of a pointer on the screen is calculated based on an operation signal output from a pointing device that moves the pointer on the screen.

When the pointer is located in the first area, a tactile sense is presented to the pointing device in a first drive mode, and when the pointer is located in the third area, a tactile sense is presented to the pointing device in a second drive mode different from the first drive mode.

Effect of the Invention

As described above, according to the present technology, it is possible to provide an intuitive pointing operational feeling.

BRIEF DESCRIPTION OF DRAWINGS

FIG. 6 Diagrams for describing one operation example of the pointing system.

FIG. 8 Diagrams for describing one operation example of the pointing system.

MODE(S) FOR CARRYING OUT THE INVENTION

Hereinafter, embodiments of the present technology will be described with reference to the drawings.

First Embodiment

Pointing System

Figure 1:
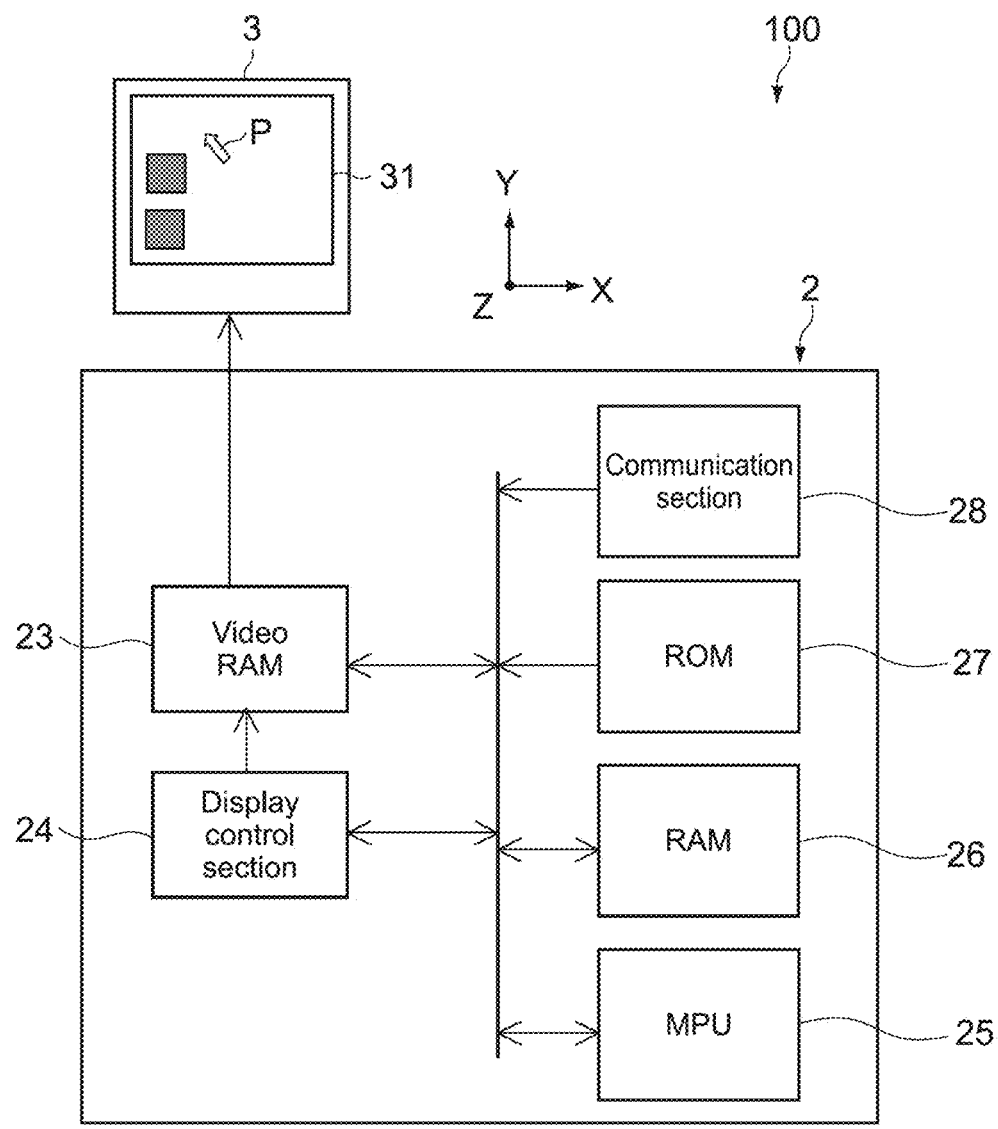
FIG. 1 A block diagram showing a pointing system according to an embodiment of the present technology.

FIG. 1 is a block diagram showing a pointing system according to an embodiment of the present technology. A pointing system 100 of this embodiment includes an input apparatus 1 (pointing device), a control apparatus 2, and a display apparatus 3.

The pointing system 100 receives an operation signal in the control apparatus 2, the operation signal being transmitted from the input apparatus 1, and controls an image displayed on a screen 31 of the display apparatus 3 in accordance with the received operation signal. The screen 31 of the display apparatus 3 has a horizontal direction in an X-axis direction, a vertical direction in a Y-axis direction, and a depth direction in a Z-axis direction of the figure.

The display apparatus 3 is a liquid crystal display or an EL (Electro-Luminescence) display, for example, but the display apparatus 3 is not limited thereto. The display apparatus 3 may be an apparatus that is formed integrally with a display and is capable of receiving television broadcasting and the like. The display apparatus 3 may be constituted of a 3D television, for example, which is capable of displaying a three-dimensional video on the screen 31.

Hereinafter, the input apparatus 1 and the control apparatus 2 will be described.

[Input Apparatus]

The input apparatus 1 includes a casing 10 having such a size that a user U can grasp the casing 10. The casing 10 is a substantially columnar body having a height direction in a y-axis direction, and a radial direction in an x-axis direction and a z-axis direction, for example. Some operation keys and the like are arranged on one surface of the casing 10.

In this embodiment, the input apparatus 1 is formed mainly as a spatial operation type pointing device for moving a pointer P displayed on the screen 31. When the user U moves the casing 10 within a space in the x-axis direction, the input apparatus 1 generates an operation signal by which the pointer P is moved in the X-axis direction, and transmits the operation signal to the control apparatus 2.

Similarly, when the user U moves the casing 10 in the y-axis direction, the input apparatus 1 generates an operation signal by which the pointer P is moved in the Y-axis direction, and transmits the operation signal to the control apparatus 2. Further, in the case where the pointer P is displayed on the screen 31 so as to be moved on the three-dimensional video, when the user U moves the casing 10 in the z-axis direction, the input apparatus 1 generates an operation signal by which the pointer P is moved in the Z-axis direction, and transmits the operation signal to the control apparatus 2.

Figure 2:
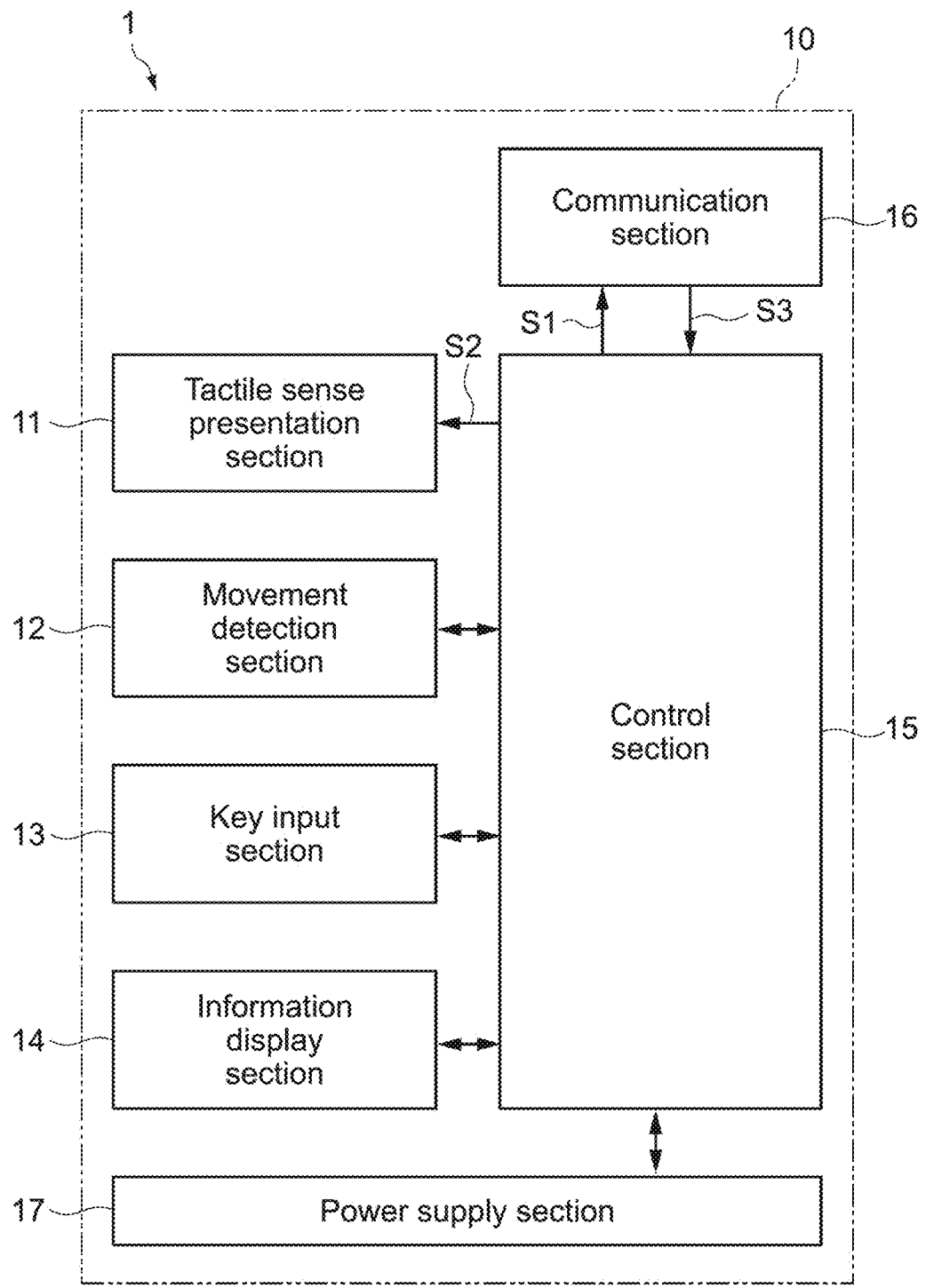
FIG. 2 A block diagram showing an internal configuration of a pointing device according to an embodiment of the present technology.

FIG. 2 is a block diagram showing an internal configuration of the input apparatus 1. The input apparatus 1 includes the casing 10, a tactile sense presentation section 11, a movement detection section 12 (sensor section), a key input section 13, an information display section 14, a control section 15, a communication section 16, and a power supply section 17.

The tactile sense presentation section 11 includes an actuator that presents a tactile sense to the casing 10. Specifically, the tactile sense presentation section 11 has a function of presenting a tactile sense to the user U via the casing 10 by driving the actuator. The tactile sense presentation section 11 is driven in a predetermined drive mode by a drive signal output from the control section 15.

Figure 3:
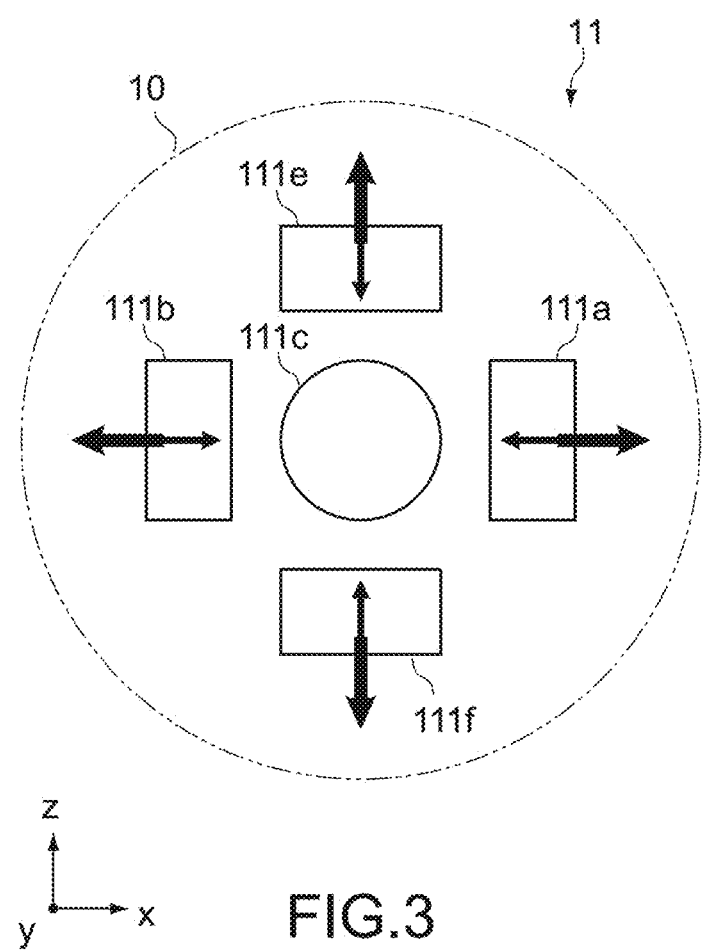
FIG. 3 A schematic plan view showing a configuration example of a tactile sense presentation section incorporated in the pointing device.
Figure 4:
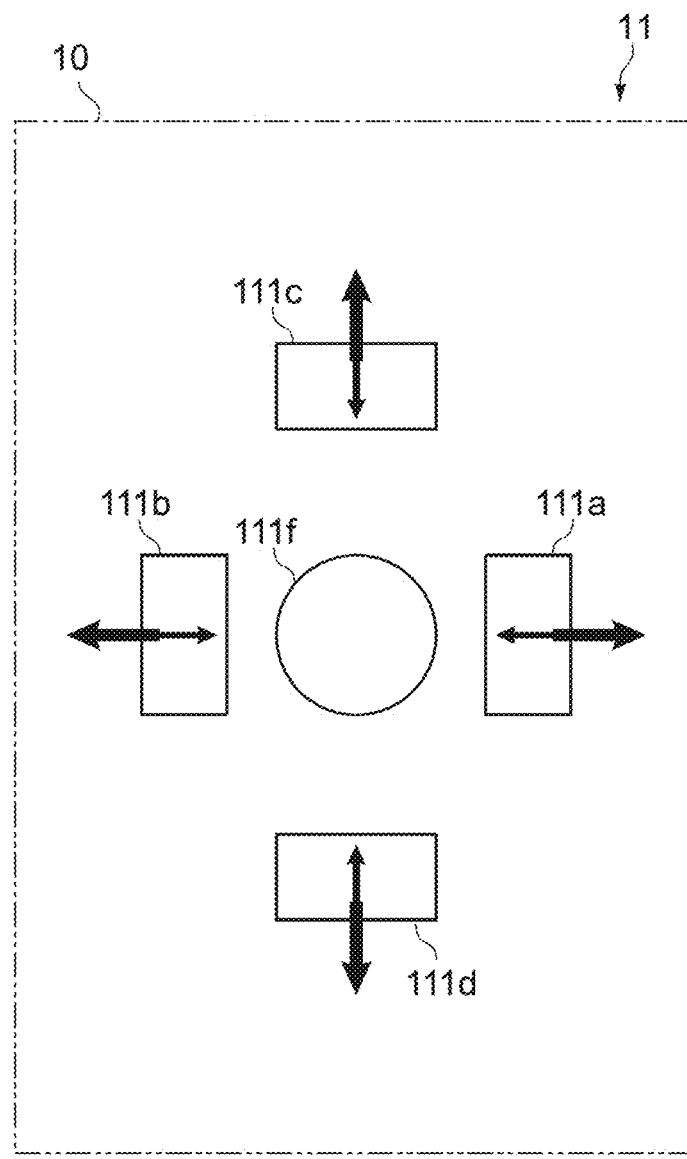
FIG. 4 A schematic side view showing a configuration example of the tactile sense presentation section incorporated in the pointing device.

FIGS. 3 and 4 are a schematic plan view and a schematic side view each showing a configuration example of the tactile sense presentation section 11. The tactile sense presentation section 11 includes a plurality of vibrating bodies each capable of generating a vibration in an arbitrary axis direction by being individually driven. In this embodiment, the tactile sense presentation section 11 includes a first set of vibrating bodies 111a and 111b that are opposed to each other in the x-axis direction, a second set of vibrating bodies 111c and 111d that are opposed to each other in the y-axis direction, and a third set of vibrating bodies 111e and 111f that are opposed to each other in the z-axis direction. Each of the vibrating bodies is formed of a voice coil motor, for example.

The directions of arrows shown in FIGS. 3 and 4 represent main directions in which vibrations of the vibrating bodies 111a to 111f are generated. Further, the thickness of the arrows relatively represents the strength of the vibrations. As the arrow becomes thicker, a stronger vibration is generated. Specifically, in this embodiment, the vibrating bodies in each set are arranged so as to be capable of generating strong vibrations in directions away from each other. Vibration amplitudes and the like can be arbitrarily changed by adjusting the level of a drive current and the like.

With the configuration described above, by driving of arbitrary vibrating bodies, the casing 10 can be vibrated in various vibrating patterns. For example, by driving of one arbitrary vibrating body, predetermined vibrations can be generated in six directions along the x, y, and z axes. Further, by driving of a plurality of arbitrary vibrating bodies to generate a composite vector in each vibration direction, predetermined vibrations can be generated in an arbitrary direction intersecting with each axis. Further, by control of a drive force and a drive timing of each vibrating body, predetermined vibrations can be generated about an arbitrary axis.

The movement detection section 12 includes an inertial sensor that detects a movement of the casing 10 operated within a space. As the inertial sensor, typically, an acceleration sensor, an angular velocity sensor, and the like are exemplified. The movement detection section 12 is formed to be capable of detecting the movement of the casing 10 in each of the x-, y-, and z-axis directions, but the configuration thereof is not limited thereto. For example, the acceleration sensor may be arranged along each axis direction, or the movement detection section 12 may be formed of a single angular velocity sensor or formed by combination of a plurality of angular velocity sensors. Besides, a geomagnetic sensor, a pressure sensor, and the like may be used together.

The key input section 13 includes various switches of a pressing type, a sliding type, and a joystick type, which are arranged at appropriate positions on the surface of the casing 10. The key input section 13 is not limited to a mechanical key switch and may include a static or optical switch or sensor. Further, in a predetermined case, an arbitrary switch may be configured to be turned on by a signal from the control section 15.

The information display section 14 is formed of a display that is incorporated in the surface of the casing 10 in an appropriate size. The information display section 14 displays various types of information such as an operation status and the remaining battery level of the pointing system 100 or the input apparatus 1 based on an output of the control section 15.

The control section 15 is formed of a computer including a ROM, a RAM, and a CPU (MPU) and supplies power to the respective sections of the input apparatus 1 and controls an operation of the input apparatus 1. The control section 15 generates an operation signal S1 based on outputs of the movement detection section 12 and the key input section 13 and transmits the operation signal S1 to the control apparatus 2 via the communication section 16. The output of the movement detection section 12 includes information on the movement of the casing 10, such as a moving direction, a moving speed, and the like of the casing 10. The output of the key input section 13 includes information on various setting operations such as an operation setting of the input apparatus 1 and a display setting of the display apparatus 3, in addition to various operations such as a click operation and an operation using a numerical keypad.

The control section 15 outputs a predetermined drive signal S2 to the tactile sense presentation section 11. In this embodiment, the drive signal S2 is generated based on a control signal S3 from the control apparatus 2, which is received via the communication section 16. The drive signal S2 includes vibration patterns including information on a generation direction of a vibration, strength, a vibration period, and the like. The control section 15 generates the drive signal S2 that corresponds to each of various vibration patterns in accordance with the contents of the control signal S3.

The communication section 16 is formed of a wireless communication module capable of performing bidirectional communication with a communication section 28 of the control apparatus 2, but wired communication may also be performed. A communication system is not particularly limited and may be an inter-device communication such as "ZigBee" (registered trademark) and "Bluetooth" (registered trademark) or may be a communication via the Internet.

The power supply section 17 forms a power supply of the input apparatus 1 and supplies necessary power to the respective sections within the casing 10. The power supply section 17 is typically formed of a battery. The battery may be a primary battery or a secondary battery. Further, the power supply section 17 may be formed of a solar battery. It should be noted that in the case of wired or wireless power feeding, the power supply section 17 is not necessary.

[Control Apparatus]

As shown in FIG. 1, the control apparatus 2 includes a video RAM 23, a display control section 24, an MPU 25, a RAM 26, a ROM 27, and the communication section 28.

The communication section 28 receives the operation signal S1 transmitted from the input apparatus 1. The MPU 25 analyzes the operation signal and performs various types of arithmetic processing using various set values and programs stored in the RAM 26 and the ROM 27. As an example of the arithmetic processing, the MPU 25 calculates a position (coordinates) of the pointer displayed on the screen 31 based on the operation signal S1 transmitted from the input apparatus 1. The display control section 24 generates screen data to be displayed mainly on the screen 31 of the display apparatus 3 according to the control of the MPU 25. The screen data includes the pointer P, an icon, video data displayed by execution of the icon, and the like. The video RAM 23 is a work area of the display control section 24 and temporarily stores the generated screen data.

The control apparatus 2 may be a device provided only for the input apparatus 1 or a generally-used information processing apparatus such as a PC (Personal Computer). Further, the control apparatus 2 may be a computer integrated with the display apparatus 3. A device to be controlled by the control apparatus 2 may be an audio-visual device, a projector, a game device, a car navigation device, or the like.

Hereinafter, the control apparatus 2 will be described in detail.

The control apparatus 2 includes an area setting section and a signal generation section.

Figure 5:
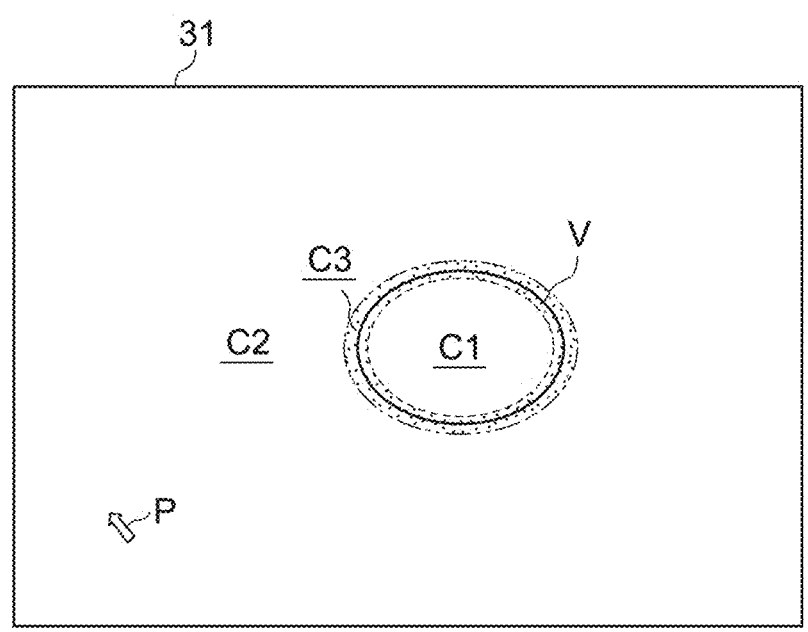
FIG. 5 A schematic diagram showing an example of an image displayed on a screen in the pointing system.

FIG. 5 is a schematic diagram showing an example of an image V displayed on the screen 31. The area setting section sets a first area C1 that belongs to the inside of a display area of the image V (object) on the screen 31, a second area C2 that belongs to the outside of the display area of the image V, and a third area C3 that belongs to a boundary portion between the first area C1 and the second area C2. The area setting section may be formed of the MPU 25, may be formed of the display control section 24, or may be formed of both of them.

The first area C1 is set inside the display area of the image V, that is, inside the display area occupied by the image V in the whole area of the screen 31. The first area C1 and the display area of the image V may not necessarily coincide with each other, and the first area C1 only needs to be set inside the display area of the image V. FIG. 5 shows an example in which an outer edge (broken line) of the first area C1 is set inward from an outer edge (solid line) of the image V indicated by the solid line.

The third area C3 is set to be adjacent to the outer edge of the first area C1, and in this embodiment, the third area C3 is formed of an annular area incorporating the outer edge of the image V. The width of the ring in this annular area can be appropriately set in accordance with the shape, size, and type of the image V, the detection sensitivity of a position of the pointer P, and the like. Further, a set width of the third area C3 may be configured to be changeable by the operation of the user U.

Typically, the image V is an icon, but it may be a two-dimensional video or a three-dimensional video other than the icon. In the case where the image V is a three-dimensional video, at least the area C1 of the areas C1 to C3 is formed of a spatial area (spatial coordinate system) associated with the three-dimensional video.

The signal generation section calculates a position of the pointer P on the screen 31 based on the operation signal S1, and when the pointer P is located in the first area C1, the signal generation section generates a first control signal (S31) by which the tactile sense presentation section 11 is driven in a first drive mode. Further, when the pointer P is located in the third area C3, the signal generation section generates a second control signal (S32) by which the tactile sense presentation section 11 is driven in a second drive mode that is different from the first drive mode. The signal generation section is formed of the MPU 25, for example. The MPU 25 outputs the generated control signal to the communication section 28, and the communication section 28 transmits the control signal to the communication section 16 of the input apparatus 1.

The first drive mode and the second drive mode are appropriately set based on strength, a period, and a rhythm of a tactile sense, combinations thereof, and the like. The first drive mode and the second drive mode are not particularly limited as long as the modes are in the form that allows the user to recognize a difference in tactile sense therebetween. In this embodiment in which the tactile sense presentation section is formed of vibrating bodies, a tactile sense can be changed in the form that is distinguishable by the user, such as a vibration force, a vibration period, and a vibration direction.

Further, the MPU 25 serving as the signal generation section is configured to, when determining that the pointer P is approaching an icon (object) by the operation of the casing 10 by the user U, output a third control signal (S33) by which the tactile sense presentation section 11 is driven in a moving direction of the casing 10. On the other hand, the MPU 25 serving as the signal generation section is configured to, when determining that the pointer P is getting away from the icon by the operation of the casing 10 by the user U, output a fourth control signal (S34) by which the tactile sense presentation section 11 is driven in a direction opposite to the moving direction of the casing 10. Thus, since a tactile sense presentation that can guide the pointer P to the icon can be achieved, a function of assisting a user's pointing operation is obtained, and an operational feeling can be improved.

Further, the MPU 25 serving as the signal generation section is configured to calculate a moving speed of the casing 10 and change a drive force of the tactile sense presentation section 11 in accordance with the calculated moving speed of the pointer P. For example, the tactile sense presentation section 11 may be driven such that a stronger tactile sense is presented as the moving speed of the casing 10 is faster. Further, a driving direction of the tactile sense presentation section 11 may be adjusted in association with a moving direction of the casing 10. Such processing may be performed by the control section 15 of the input apparatus 1, in addition to the MPU 25.

Operation Example of Pointing System

Next, some operation examples of the pointing system 100 will be described.

Operation Example 1

FIG. 6(A) shows a display example of the screen 31 on which a plurality of icons V1 to V4 are arranged with intervals therebetween. In the example shown in the figure, the icons V1 to V4 each have a rectangular shape with the same size and are displayed on the screen 31 in a layout of two rows by two columns. Each of the icons V1 to V4 is a GUI that is selected by an operation of moving the pointer P by the user U and executed by an input into operation keys provided to the casing 10 of the input apparatus 1.

The control apparatus 2 sets the first area C1, the second area C2, and the third area C3 in the inside and outside of each display area of the icons V1 to V4 and in a predetermined area of each boundary of the icons V1 to V4. Thus, an area among the icons V1 to V4 adjacent to one another is set as the third area C3.

The movement of the pointer P1 on the screen 31 is controlled by an operation of moving the input apparatus 1 within the space by the user U. Specifically, the movement of the casing 10 is detected by the movement detection section 12 of the input apparatus 1, and an operation signal S1 containing information on the movement of the casing 10 is generated by the control section 15 of the input apparatus 1. The control apparatus 2 receives the operation signal S1 transmitted from the input apparatus 1 and calculates a position of the pointer P1 by predetermined arithmetic processing based on the operation signal S1. Then, the control apparatus 2 controls display of the movement of the pointer P1 on the screen 31 in a direction and at a speed that correspond to the moving direction and the moving speed of the casing 10.

For example, it is assumed that in order to select the icon V3, the user U linearly moves the pointer P1 from a position indicated by a chain line shown in FIG. 6(A) toward a position on the icon V3 indicated by a solid line. When the pointer P1 enters the third area C3 set around the icon V3, the control apparatus 2 generates a control signal S3 (S32) by which the tactile sense presentation section 11 is driven in the second drive mode and transmits the control signal S3 to the input apparatus 1. Thus, the input apparatus 1 generates a drive signal S2 corresponding to the control signal S3 (S32) and generates a tactile sense in the second drive mode by the tactile sense presentation section 11. Thus, the user U can recognize that the pointer P1 is approaching the icon V2.

Next, when the pointer P1 enters the first area C1 set inside the display area of the icon V3, the control apparatus 2 generates a control signal S3 (S31) by which the tactile sense presentation section 11 is driven in the first drive mode and transmits the control signal S3 to the input apparatus 1. Thus, the input apparatus 1 generates a drive signal S2 corresponding to the control signal S3 (S31) and generates a tactile sense in the first drive mode (for example, a tactile sense stronger than the tactile sense in the second drive mode) by the tactile sense presentation section 11. Since the first drive mode allows the tactile sense presentation section 11 to be driven in a vibration pattern different from that in the second drive mode, the user U can reliably recognize that the pointer P1 reaches the icon V3 and appropriately perform an operation of executing the icon V2.

As described above, according to this embodiment, since the tactile sense is fed back to the user U via the casing 10 at the time of the pointing operation made on the icon V3, it is possible to reduce the degree of dependence on visual recognition of the user U and provide a more intuitive pointing operational feeling. Further, when the pointer P1 is located in an area around the icon V3 (third area C3), a tactile sense that is different from that when the pointer P1 is located inside the display area (first area C1) of the icon V3 is presented. Therefore, it is possible to induce an appropriate pointing operation to be made on the icon V3 and achieve improvement in operational feeling.

On the other hand, as shown in FIG. 6(B), it is assumed that the pointer P1 is linearly moved from the position on the icon V3, which is indicated by the chain line shown in the figure, toward a position on the icon V2 indicated by a solid line. In this case, the pointer P1 goes across the third area C3. Accordingly, when the pointer P1 is moved from the icon V3 to the icon V2, after a tactile sense in the second drive mode is presented again to the user U, a tactile sense in the first drive mode, which indicates that the pointer P1 reaches the icon V2, is presented to the user U. Thus, the user U can recognize that the pointer P1 reliably reaches the icon V2 as a target from the initial icon V3.

As described above, according to this embodiment, even when a plurality of icons are arrayed on the screen, such a feeling that the pointer traverses each icon can be presented to a user. Therefore, the pointer can be appropriately guided to a desired icon using a visual sense and a tactile sense of the user. Further, come-and-go among icons can be recognized using only a tactile sense without relying on a visual sense. Furthermore, a tactile sense presenting pattern in the first drive mode may be varied between icons. Thus, a plurality of icons can be individually distinguished using only a tactile sense.

Operation Example 2

Figure 7:
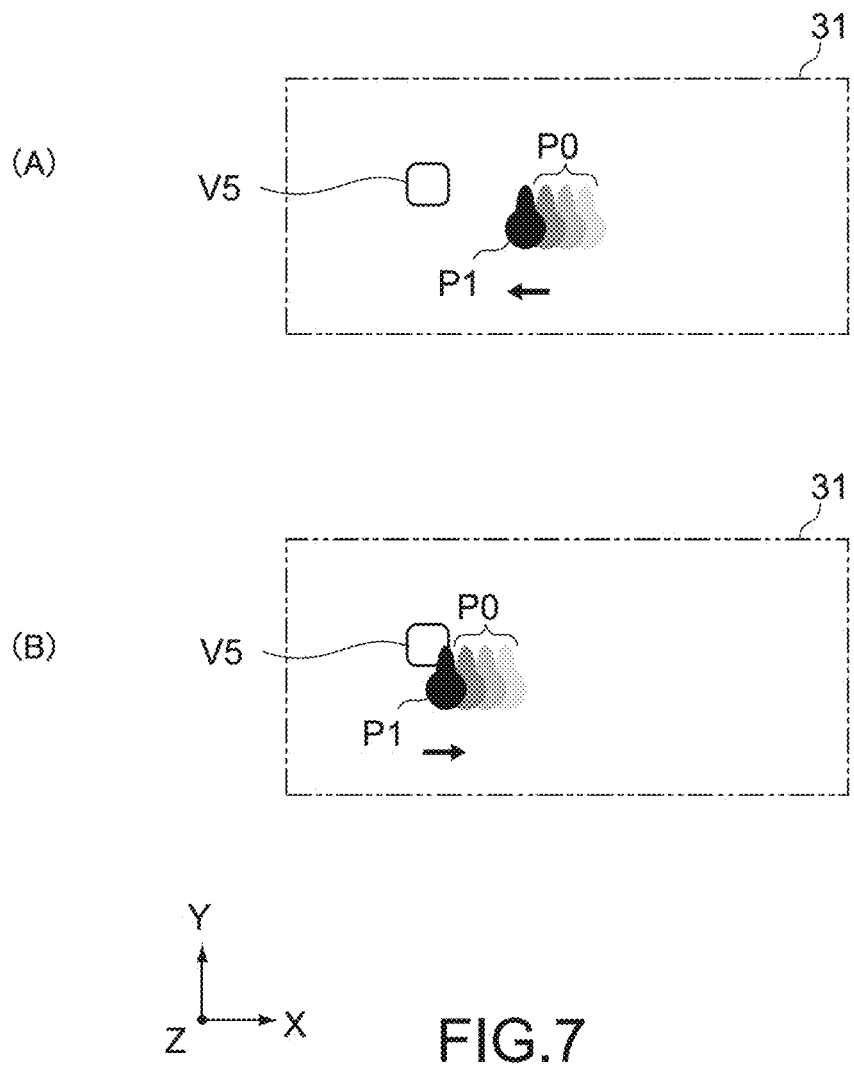
FIG. 7 Diagrams for describing one operation example of the pointing system.

FIGS. 7 and 8 are display examples of the screen showing a state when a pointing operation is performed on an icon V5 with a pointer P1. FIG. 7 each show a state where the pointer P1 is moved at a relatively low speed, and FIG. 8 each show a state where the pointer P1 is moved at a relatively high speed. Further, in each of FIGS. 7 and 8, (A) shows a state where the pointer P1 is moved toward the icon V5, and (B) shows a state where the pointer P1 reaches the icon V5.

Here, arrows in the figures each indicate a direction and strength of a tactile sense presented to the user U, and a thicker line of the arrow represents a stronger tactile sense. Further, P0 represents a group of afterimages of the pointer P1. In the case where the moving speed is low, the images are shown in a superimposed manner (FIG. 7), and in the case where the moving speed is high, the images are shown in a separate manner (FIG. 8). Furthermore, out of the images forming the group, a more softly-colored image represents an earlier image of the pointer P1.

As shown in FIGS. 7(A) and 8(A), in the case where the pointer P1 is moved toward the icon V5, the control apparatus 2 generates a control signal (S33) by which a tactile sense is generated toward the moving direction of the casing 10 and outputs the control signal to the input apparatus 1. The input apparatus 1 receives the control signal, and the control section 15 outputs a drive signal, by which a vibration is generated in an operating direction of the casing 10, to the tactile sense presentation section 11. In the examples shown in the figures, by driving of the vibrating body 111b of the tactile sense presentation section 11 (see FIGS. 3 and 4), a tactile sense in the moving direction (−X direction) of the casing 10 is presented to the user U via the casing 10. Thus, a tactile sense presentation to lead the pointer P1 to the icon V5 is achieved.

Then, as shown in FIGS. 7(B) and 8(B), when the pointer P1 reaches the icon V5, the control apparatus 2 generates a control signal by which a tactile sense is generated in a direction opposite to the moving direction of the casing 10, and outputs the control signal to the input apparatus 1. In reaction to this, the control section 15 of the input apparatus 1 outputs a drive signal, by which a vibration is generated in a direction opposite to the operating direction of the casing 10, to the tactile sense presentation section 11. In the examples shown in the figures, by driving of the vibrating body 111a of the tactile sense presentation section 11 (see FIGS. 3 and 4), a tactile sense in a direction (+X direction)

opposite to the moving direction of the casing 10 is presented to the user U via the casing 10. Thus, information to stimulate the stop of movement of the pointer P1 can be presented to the user U, and an effect to induce the pointer P1 to the icon V5 can be further enhanced.

Further, by control of the strength of a tactile sense to be synchronized with the moving speed of the pointer P1, an operational feeling of moving the pointer P1 can be enhanced for the user U. In the examples of FIGS. 7 and 8, settings are made such that as the moving speed of the pointer P1 becomes higher, a weaker sensory tentacle is presented, and as the moving speed of the pointer P1 becomes higher, a tactile sense toward a direction opposite to the moving direction presented at the time of arrival at the icon V5 becomes larger. However, the present technology is not limited thereto as a matter of course.

Further, in the case where the pointer P1 is moved in a direction away from the icon V5, a control may be made such that a tactile sense is generated in the casing 10 in a direction opposite to the moving direction thereof. Thus, a tactile sense to return the pointer P1 to the position where the icon V5 is displayed can be presented to the user U.

As described above, by presentation of a tactile sense synchronizing the moving speed of the pointer P1 to the user U, an operational feeling of the pointer P1 can be enhanced. Further, by presentation of a tactile sense related to relative positions of the pointer P1 and the icon V5 to the user U, it is possible to facilitate a pointing operation and achieve a reduction of the burden of the user U.

Figure 9:
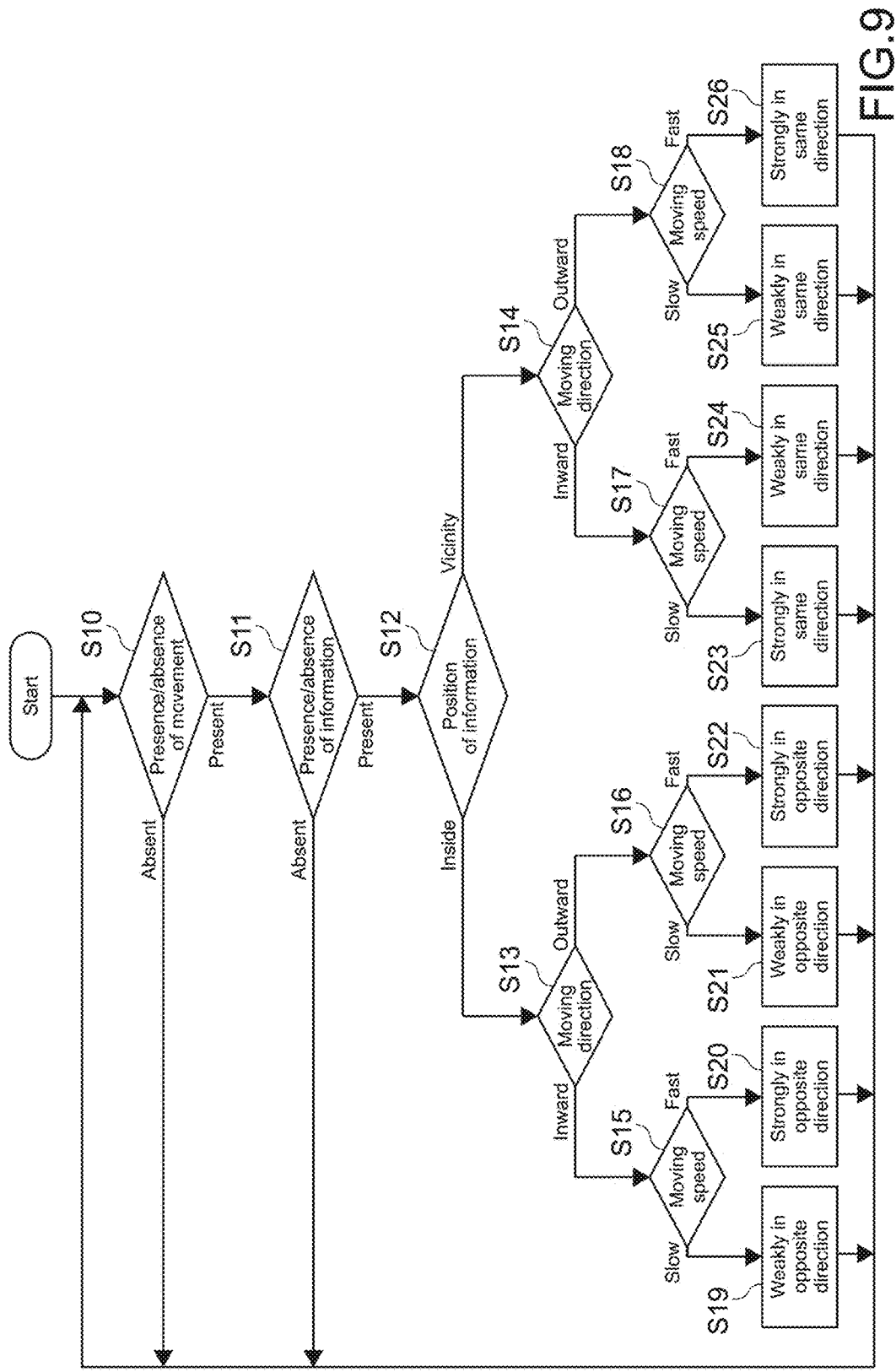
FIG. 9 A flowchart for describing one control example of the pointing system.

FIG. 9 is a control flow showing a processing procedure of the control apparatus 2 based on the operation examples described above. The flow shown in the figure is merely an example and can be appropriately changed in accordance with specifications and settings.

In FIG. 9, S10 is a step of determining the presence or absence of a movement of the input apparatus 1 (the presence or absence of movement of a relative position with respect to a virtual object), and S11 is a step of determining the presence or absence of icon (information). S12 is a step of determining a positional relationship between the pointer and the icon, and S13 and S14 are steps of determining a moving direction of the pointer with respect to the icon. S15 to S18 are steps of determining a moving speed of the pointer, and S19 to S26 are steps of executing a determination result on a tactile sense to be presented.

In S10, if the input apparatus 1 is not moved, the status is kept until a movement of the input apparatus 1 is detected. When a movement of the input apparatus 1 is detected, the status is transferred to S11. In S11, the control apparatus 2 determines whether an icon V5 that needs a tactile sense presentation exists in the vicinity of the pointer P1. If there is no icon V5, the status is transferred to S10. If there is an icon V5, the status is transferred to S12. In S12, the control apparatus 2 determines a positional relationship between the pointer P1 and the icon V5. In this determination, a position of the pointer P1 and the first area C1 corresponding to a display area of the icon V5 are each referred to.

In the case where the pointer P1 is located inside the display area of the icon V5, the status is transferred to S13, and in the case where the pointer P1 is located outside the display area of the icon V5 (for example, in the vicinity), the status is transferred to S14. In S13 and S14, the control apparatus 2 determines a moving direction of the pointer P1 with respect to the icon V5. In the case where the pointer P1 is moved to the inside of the icon V5, the status is transferred to S15 and S17. In the case where the pointer P1 is moved to the outside of the icon V5, the status is transferred to S16 and S18. In S15 to S18, the control apparatus 2 determines a moving speed of the pointer P1 and separates the speed into a slower one and a faster one than a predetermined value to generate a control signal corresponding to presentation contents of a preset tactile sense (S19 to S26).

In S19 to S26, the strength of a tactile sense indicates a relative relationship and does not determine an absolute value. Further, in this example, a two-stage evaluation, "slow" and "fast", is used for determination of the moving speed, but the determination is not limited thereto. A multistage evaluation may be set, or not a stepwise evaluation but a continuous evaluation may be used. Further, those determination results are merely examples, and a presentation direction or strength of a force can be appropriately changed depending on a required effect, for example, what somatic sense is imparted to the user.

Operation Example 3

Figure 10:
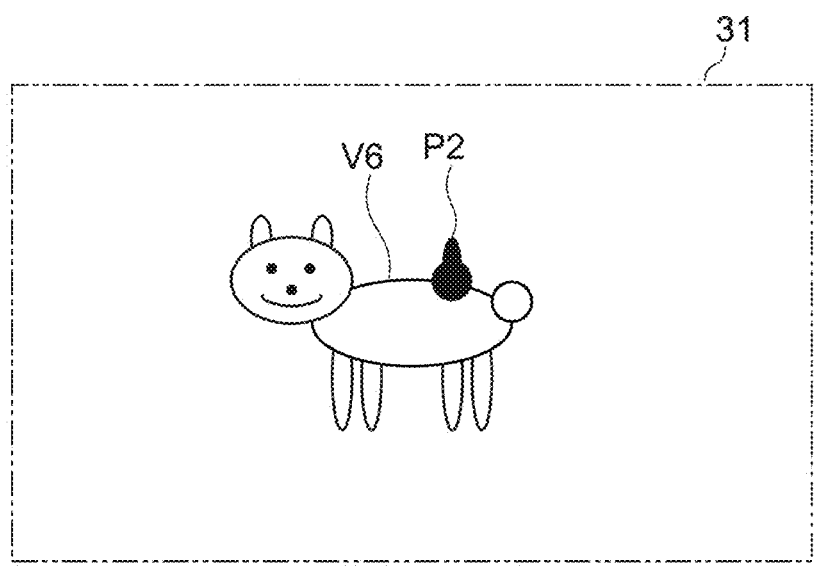
FIG. 10 A diagram for describing one operation example of the pointing system.

FIG. 10 shows a display example of a screen for describing another operation example of the pointing system 100. In FIG. 10, an image V6 represents a small animal such as a dog or a cat. Though not shown in the figure, the first area C1 is set inside a display area of the image V6, and the third area C3 is set in the periphery of the image V6.

In this example, when moving a pointer P2 along the third area C3, the control apparatus 2 generates a control signal, by which the tactile sense presentation section 11 is driven in a drive mode in which a tactile sense that provides a texture of stroking hair of the animal is presented, for example. On the other hand, when moving the pointer P2 within the first area C1, the control apparatus 2 generates a control signal, by which the tactile sense presentation section 11 is driven in a drive mode in which a tactile sense that provides a texture of playing with the animal is presented, for example. Thus, by stimulation of the tactile sense besides the visual sense and auditory sense of the user, a more realistic somatic sense can be provided to the user U.

Here, the image V6 may be a two-dimensional video or a three-dimensional video. For example, in the case of a three-dimensional video, the first area C1 can be set in three-dimensional coordinates associated with the video. Then, the area C1 may be further divided into a plurality of areas so that the drive mode (first drive mode) of the tactile sense presentation section 11 may be changed to present different tactile senses for the respective divided areas. Thus, different tactile senses can be presented not only in a planar direction of the screen 31 but also in a depth direction of the screen.

Second Embodiment

Figure 11:
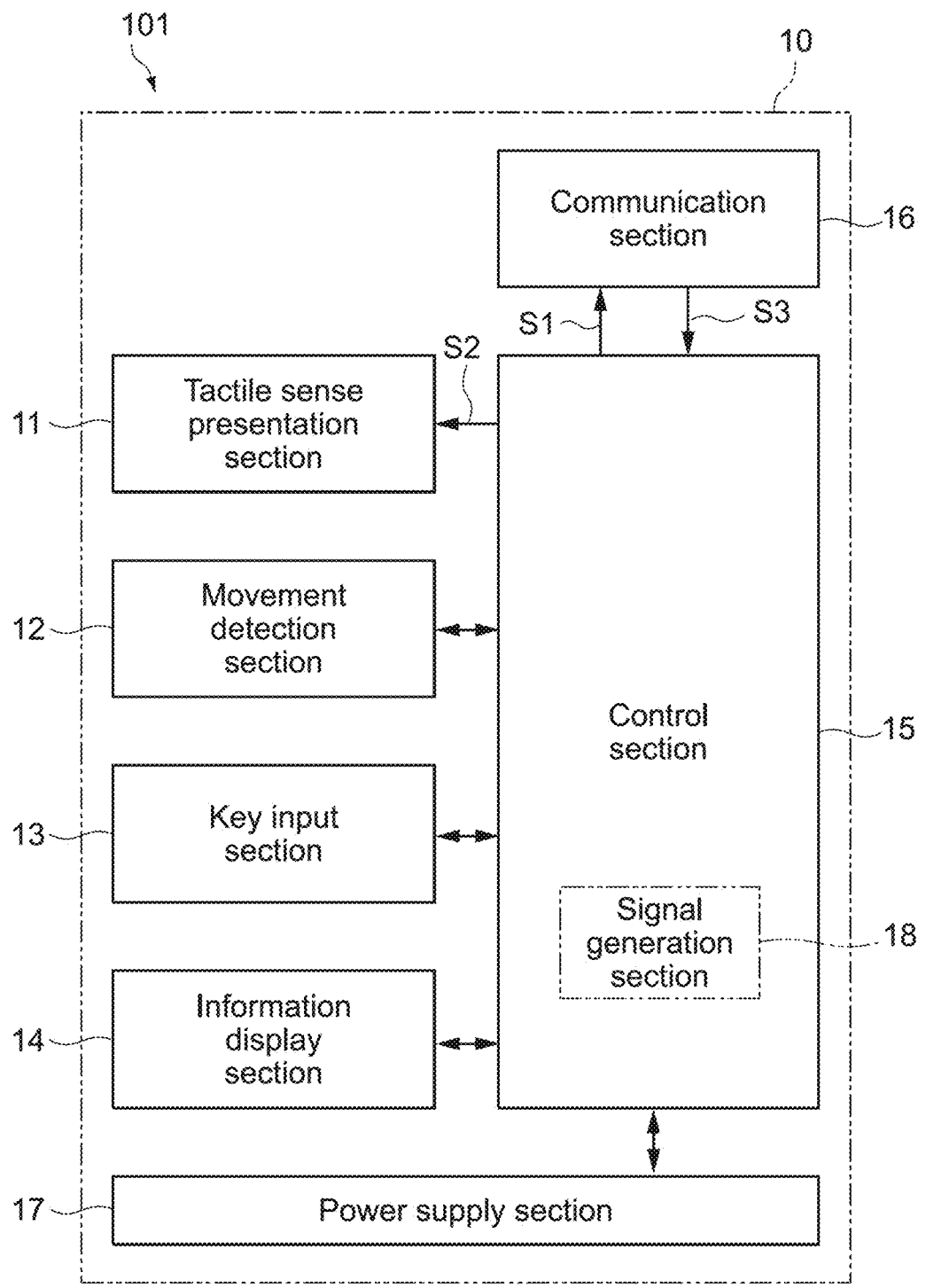
FIG. 11 A block diagram showing an internal configuration of a pointing device according to another embodiment of the present technology.

FIG. 11 is a block diagram showing a configuration of an input apparatus (pointing device) according to a second embodiment of the present technology. Here, configurations different from those in the first embodiment will be mainly described, and the same configurations as those in the embodiment described above are denoted by the same reference symbols and description thereof will be omitted or simplified.

An input apparatus 101 according to this embodiment includes a casing 10, a tactile sense presentation section 11, a movement detection section 12 (sensor section), a key input section 13, an information display section 14, a control section 15, a communication section 16, and a power supply section 17. The control section 15 includes a signal generation section 18.

When a pointer is located inside a display area (first area C1) of an icon (object) on a screen, the signal generation section 18 generates a first control signal by which the tactile sense presentation section 11 is driven in a first drive mode. On the other hand, when the pointer is located in a predetermined area (third area C3) around the icon, the signal generation section 18 generates a second control signal by which the tactile sense presentation section 11 is driven in a second drive mode that is different from the first drive mode.

Specifically, this embodiment is different from the first embodiment in that the control signal corresponding to the drive mode of the tactile sense presentation section 11 is generated by not the control apparatus 2 but the input apparatus 101. Also with such a configuration, the same action as that of the first embodiment can be obtained.

In this embodiment, information on a position of the pointer, the area of the icon, and the like (for example, coordinate information) is determined based on the control signal transmitted from the control apparatus 2. Alternatively, the input apparatus 101 may acquire the coordinate information from another device other than the control apparatus 2.

Hereinabove, the embodiments of the present technology have been described, but the present technology is not limited to the embodiments described above and can be variously modified without departing from the gist of the present technology as a matter of course.

For example, in the embodiments described above, the pointing system 100 is configured such that the tactile sense presentation section 11 is driven in the drive modes in which the pointer causes tactile senses different between the first area C1 and the third area C3 to be presented. However, also when the pointer is located in a second area C2 that is set outside the display area of the icon, a drive mode in which a peculiar tactile sense is presented may be set.

Further, in the embodiments described above, the configuration in which a tactile sense associated with a movement of the pointer (direction, speed) is presented to the user U has been described, but in addition thereto, another tactile sense presentation mode that allows the user to recognize a stopped (stationary) state of the pointer may be set. Thus, an operational feeling including a stop and a movement of the pointer can be provided to the user.

Furthermore, in the embodiments described above, the example in which a movement of the input apparatus 1 within a space is detected with the inertial sensor has been described. Instead of or in addition to this, the movement of the input apparatus 1 may be directly determined with an image sensor and the movement of the pointer may be controlled.

Further, the tactile sense presentation section 11 is not limited to a configuration in which a tactile sense is imparted to the casing 10 by a vibration action by the vibrating bodies. For example, various mechanisms to partially modify the surface of the casing 10, to generate moment inside the casing 10, to generate a voltage for imparting an electrical stimulation to the surface of the casing 10, and the like can be adopted.

It should be noted that the present technology can take the following configurations.

(1) A pointing system, including:
 a pointing device including
  a casing,
  a tactile sense presentation section capable of presenting a tactile sense to the casing, and
  a sensor section to detect an operation for the casing and output an operation signal for controlling a movement of a pointer on a screen; and
 a control apparatus including
  an area setting section to set a first area that belongs to an inside of a display area of an object on the screen, a second area that belongs to an outside of the display area of the object, and a third area that belongs to a boundary portion between the first area and the second area, and
  a signal generation section to calculate a position of the pointer on the screen based on the operation signal to generate, when the pointer is located in the first area, a first control signal by which the tactile sense presentation section is driven in a first drive mode and generate, when the pointer is located in the third area, a second control signal by which the tactile sense presentation section is driven in a second drive mode different from the first drive mode.

(2) The pointing system according to (1) above, in which
 the pointing device is a spatial operation type input apparatus, and
 the tactile sense presentation section includes a plurality of vibrating bodies each capable of generating a vibration in an arbitrary axis direction by being individually driven.

(3) The pointing system according to (1) or (2) above, in which
 the signal generation section generates, when determining that the pointer is approaching the object by an operation of the casing, a third control signal by which the tactile sense presentation section is driven toward a moving direction of the casing.

(4) The pointing system according to any one of (1) to (3) above, in which
 the signal generation section generates, when determining that the pointer is getting away from the object by an operation of the casing, a fourth control signal by which the tactile sense presentation section is driven toward a direction opposite to the moving direction of the casing.

(5) The pointing system according to any one of (1) to (4) above, in which
 the signal generation section calculates a moving speed of the casing and changes a drive force of the sensory tentacle presentation section in accordance with the calculated moving speed.

(6) The pointing system according to any one of (1) to (5) above, in which
 the object is an icon.

(7) The pointing system according to any one of (1) to (6) above, in which
 the object is a three-dimensional video, and
 the first area is a three-dimensional area associated with the three-dimensional video.

(8) The pointing system according to any one of (1) to (7) above, in which
 the sensor section includes an inertial sensor to detect a movement of the casing and generate a signal associated with the movement.

(9) A pointing device, including:
 a casing;
 a tactile sense presentation section capable of presenting a tactile sense to the casing;
 a sensor section to detect a movement of the casing within a space and output an operation signal for controlling a movement of a pointer on a screen; and
 a signal generation section to generate, when the pointer is located in an inside of a display area of an object on the screen, a first control signal by which the tactile sense presentation section is driven in a first drive mode and generate, when the pointer is located in a predetermined area around the object, a second control signal by which the tactile sense presentation section is driven in a second drive mode different from the first drive mode.

(10) A pointing control method, including:
setting a first area that belongs to an inside of a display area of an object on a screen, a second area that belongs to an outside of the display area of the object, and a third area that belongs to a boundary portion between the first area and the second area;
calculating a position of a pointer on the screen based on an operation signal output from a pointing device that moves the pointer on the screen; and
presenting, when the pointer is located in the first area, a tactile sense to the pointing device in a first drive mode and presenting, when the pointer is located in the third area, a tactile sense to the pointing device in a second drive mode different from the first drive mode.

DESCRIPTION OF SYMBOLS 1, 101 input apparatus
2 control apparatus
3 display apparatus
10 casing
11 tactile sense presentation section
12 movement detection section
15 control section
18 signal generation section
24 display control section
25 MPU
31 screen
100 pointing system
111a to 111f vibrating body
C1 first area
C2 second area
C3 third area
P, P1, P2 pointer
U user
V, V6 image
V1 to V5 icon

The invention claimed is:
1. A pointing system, comprising:
a pointing device, wherein the pointing device is a spatial operation type input apparatus, the pointing device including:
a casing,
a tactile sense presentation section including a plurality of vibrating bodies, each of which is configured to generate a vibration in an arbitrary axis direction by being individually driven, wherein the tactile sense presentation section is configured to present a tactile sense having tactile characteristics to the casing, and
a sensor section configured to detect an operation for the casing and output an operation signal for controlling a movement of a pointer on a screen; and
at least one processor programmed to:
set a first area that belongs to an inside of a display area of an object on the screen, a second area that belongs to an outside of the display area of the object, and a third area that belongs to a boundary portion between the first area and the second area;
calculate a position of the pointer on the screen based on the operation signal;
generate, in response to determining that the pointer has entered the first area, a first control signal by which the tactile sense presentation section is driven in a first drive mode;
generate, when the pointer is located in the third area, a second control signal by which the tactile sense presentation section is driven in a second drive mode, wherein the tactile characteristics of a first tactile sense presented by the tactile sense presentation section to the casing when driven in the first drive mode are different than the tactile characteristics of a second tactile sense presented by the tactile sense presentation section to the casing when driven in the second drive mode;
determine that the pointer is moving toward the object by an operation of the casing; and
generate, in response to determining that the pointer is moving toward the object, a third control signal by which the tactile sense presentation section is driven toward a moving direction of the casing.

2. The pointing system according to claim 1, wherein the at least one processor is further programmed to generate, when determining that the pointer is moving away from the object by the operation of the casing, a fourth control signal by which the tactile sense presentation section is driven toward a direction opposite to the moving direction of the casing.

3. The pointing system according to claim 1, wherein the at least one processor is further programmed to:
calculate a moving speed of the casing; and
change a drive force of the tactile sense presentation section in accordance with the calculated moving speed.

4. The pointing system according to claim 1, wherein the object is an icon.

5. The pointing system according to claim 1, wherein the object is a three-dimensional video, and the first area is a three-dimensional area associated with the three-dimensional video.

6. The pointing system according to claim 1, wherein the sensor section includes an inertial sensor configured to detect a movement of the casing and generate a signal associated with the movement.

7. The pointing system according to claim 1, wherein:
the at least one processor is further programmed to generate, when the pointer is located in the second area, a fifth control signal by which the tactile sense presentation section is driven in a third drive mode.

8. The pointing system according to claim 1, wherein when the screen displays a plurality of objects,
the at least one processor is further programmed to:
set, for each object of the plurality of objects, a first area that belongs to the inside of a display area of each object; and
generate a different control signal when the pointer is located in the first area of a first object of the plurality of objects than when the pointer is located in the first area of a second object of the plurality of objects, wherein the tactile characteristics of the tactile sense presented by the tactile sense presentation section to the casing, when driven in response to the different control signals, are different.

9. The pointing system according to claim 1, wherein:
the at least one processor is further programmed to change a width of the third area based on an operation of the user.

10. The pointing system according to claim 1, wherein: the tactile characteristics of the first tactile sense and/or the second tactile sense comprise a plurality of vibrating patterns.

11. The pointing system according to claim 1, wherein: the at least one processor is incorporated within the casing of the pointing device.

12. A pointing device, wherein the pointing device is a spatial operation type input apparatus, the pointing device comprising:
a casing;
a tactile sense presentation section including a plurality of vibrating bodies each of which is configured to generate a vibration in an arbitrary axis direction by being individually driven, wherein the tactile sense presentation section is configured to present a tactile sense having tactile characteristics to the casing;
a sensor section configured to detect a movement of the casing within a space and output an operation signal for controlling a movement of a pointer on a screen; and
at least one processor programmed to:
generate, in response to determining that the pointer has entered an inside of a display area of an object on the screen, a first control signal by which the tactile sense presentation section is driven in a first drive mode;
generate, when the pointer is located in a predetermined area around the object, a second control signal by which the tactile sense presentation section is driven in a second drive mode, wherein the tactile characteristics of a first tactile sense presented by the tactile sense presentation section to the casing when driven in the first drive mode are different than the tactile characteristics of a second tactile sense presented by the tactile sense presentation section to the casing when driven in the second drive mode;
determine that the pointer is moving toward the object by an operation of the casing; and
generate, in response to determining that the pointer is moving toward the object, a third control signal by which the tactile sense presentation section is driven toward a moving direction of the casing.

13. A pointing control method, comprising:
setting a first area that belongs to an inside of a display area of an object on a screen, a second area that belongs to an outside of the display area of the object, and a third area that belongs to a boundary portion between the first area and the second area;
calculating a position of a pointer on the screen based on an operation signal output from a pointing device that moves the pointer on the screen;
presenting, in response to determining that the pointer has entered the first area, a first tactile sense having tactile characteristics to the pointing device in a first drive mode;
presenting, when the pointer is located in the third area, a second tactile sense having tactile characteristics to the pointing device in a second drive mode, wherein the tactile characteristics of the first tactile sense in the first drive mode are different than the tactile characteristics of the second tactile sense in the second drive mode;
determining that the pointer is moving toward the object by an operation of the casing of the pointing device; and
presenting, in response to determining that the pointer is moving toward object, a third tactile sense having tactile characteristics toward a moving direction of the casing to the pointing device in a third drive mode.

14. The pointing control method according to claim 13, further comprising:
presenting, in response to determining that the pointer is moving away from the object by the operation of the casing, a fourth tactile sense having tactile characteristics indicating a direction opposite to the moving direction of the casing.

15. The pointing control method according to claim 13, further comprising:
calculating a moving speed of the casing; and
changing a drive force of the first tactile sense, the second tactile sense, or the third tactile sense in accordance with the calculated moving speed.

16. The pointing control method according to claim 13, further comprising:
presenting, when the pointer is located in the second area, a fifth tactile sense having tactile characteristics to the pointing device in a third drive mode.

17. The pointing control method according to claim 13, wherein when the screen displays a plurality of objects, the method further comprises:
setting, for each object of the plurality of objects, a first area that belongs to the inside of a display area of each object; and
presenting a different tactile sense when the pointer is located in the first area of a first object of the plurality of objects than when the pointer is located in the first area of a second object of the plurality of objects.

18. The pointing control method according to claim 13, further comprising changing a width of the third area based on an operation of the user.

19. The pointing control method according to claim 13, wherein the tactile characteristics of the first tactile sense and/or the second tactile sense comprise a plurality of vibrating patterns.

* * * * *